US006263073B1

(12) United States Patent
Lai et al.

(10) Patent No.: US 6,263,073 B1
(45) Date of Patent: Jul. 17, 2001

(54) METHOD OF IMPROVING THE CAS TONE SIGNAL DETECTION OF A TELEPHONE AND THE APPARATUS THEREFOR

(75) Inventors: Zhen-Xing Lai, Taipei (TW); Bang-Hua Mao, Nanking (CA); Jia-Guo Han, Nanking (CA); Jiang-Zhong Gao, Nanking (CA)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/046,596

(22) Filed: Mar. 24, 1998

(51) Int. Cl.[7] .............................. H04M 3/42; H04M 1/56

(52) U.S. Cl. .......................... 379/386; 379/372; 379/142

(58) Field of Search .................................... 379/386, 387, 379/372–376, 142, 201, 215, 351, 283, 257

(56) References Cited

U.S. PATENT DOCUMENTS 5,649,002 * 7/1997 Brady et al. ......................... 379/351
5,926,541 * 7/1999 Irie ....................................... 379/386

* cited by examiner

*Primary Examiner*—Wing F. Chan
(74) *Attorney, Agent, or Firm*—Bacon & Thomas, PLLC

(57) ABSTRACT

A method of improving the CAS (customer premises equipment alert signal) tone signal detection of a telephone which uses a CAS tone signal detection chip or data signal processor in the telephone to detect a small segment of the CAS tone signal received from the exchange line and to trigger a CPU in producing an interruption signal, causing the telephone to mute the voice signal from the near end subscriber and to detect and judge the time series of the left CAS tone signal, and uses a voice signal detection circuit to monitor the voice signal from the far end subscriber, so that the telephone accurately measures the length of the CAS tone signal when no voice signal from the far end subscriber or the near end subscriber is detected, and judges, subject to the definition of a predetermined CAS tone signal length specification, whether the CAS tone signal is true or false.

14 Claims, 5 Drawing Sheets

| Item | Requirement |
| --- | --- |
| Low Tone Frequency | 2130Hz+/-0.5% |
| High Tone Frequency | 2750Hz+/-0.5% |
| Received Signal Level | -14dBm to –32dBm |
| Signal Reject Level | -45dBm |
| Twist | up to 6dBm |
| Unwanted Signal | <=-7dBm ASL(Active Speech Level) near end Speech |
| Duration | 75ms to 85 ms |
| Speech Present | Yes |

Fig. 1

METHOD OF IMPROVING THE CAS TONE SIGNAL DETECTION OF A TELEPHONE AND THE APPARATUS THEREFOR

BACKGROUND OF THE INVENTION

The present invention relates to a method of improving the CAS tone signal detection of a telephone which detects a small segment of the received CAS tone signal (CPE alert signal, in which CPE is an abbreviation of customer premises equipment), then mutes the voice signal from the near end subscriber, and then detects the time series of the left CAS tone signal and monitors the voice signal from the far end subscriber, so as to accurately measure the length of the CAS tone signal when no voice signal from the far end subscriber or the near end subscriber is detected, and then to determine, subject to the definition of the predetermined CAS tone signal length specification, whether the received CAS tone signal is true or false.

In addition to the conventional voice communication function, advanced telephones provide a digital communication function. CIDCW (Caller ID Call Waiting) identification function is the most popularly employed digital communication function. Through the exchange line from the telecommunication office, the telephone number, name and other information of the caller are transmitted to the telephone of the called party, and shown on display means for example a LCD (liquid crystal display) on the called party's telephone. Before receiving the telephone call, the called party can know the caller's identification through the display on the telephone.

Technically, a telephone with CIDCW identification function receives a CAS tone signal before receiving a CIDCW data from the exchange line of the telecommunication office. The CAS tone signal is to call the called party's telephone. Following the CAS tone signal to the called party's telephone is a CIDCW data. Therefore, preventing an interference from the near end subscriber and the far end subscriber so as to let the called party's telephone accurately receive the CAS tone signal upon the detection of the CAS tone signal is a prerequisite to the completion of the receipt of the CIDCW data. However, it is difficult to accurately receives the CAS tone signal.

According to British CIDCW specifications SIN 242 and SIN 227, the CAS tone signal has parameter characteristics as shown in FIG. 1. Because the frequency of the CAS tone signal is within the range of AF (audio frequency), the voice signal from telephone at the near end as well as the far end and external noises may be falsely detected as a CAS tone signal, causing the actual CAS tone signal unable to be accurately detected. For example, if the CAS tone signal is interrupted due to a voice signal or external noise interference, the tone signal is judged non-effective, and the following CIDCW data is rejected. This is the so-called talk-down performance in CAS tone signal detection. Further, if the caller's telephone does not transmit the CAS tone signal, and the called party's telephone make a wrong judgment due to the interference of a voice signal or external noises, the called party's telephone works falsely. This is the so-called talk-off performance in CAS tone signal detection.

A telephone with CIDCW identification function, as shown in FIG. 2, generally comprises a CAS tone signal detection chip (it can be a Mitel 8843 chip) 11, a talk circuit 12, a CPU 13, a microphone 14, a speaker 15, a bridge 16, a select/release circuit 17, and a LCD 18. The select/release circuit 17 receives the digital signal from the exchange line through signal terminals A;B, then transmits the received digital signal to the CAS tone signal detection chip 11 for detecting the presence of a CAS tone signal. Upon detection of the CAS tone signal, the CAS tone signal detection chip 11 immediately triggers the CPU 13, causing it to receive the following CIDCW data, and to show the caller's telephone number and name and other information through the LCD 18, and the voice signals from the caller and the called party are sent through the bridge 16 and the talk circuit 12 to the microphone 14 or the speaker 15.

Using the CAS tone signal detection chip 11 for detecting the presence of a CAS tone signal provides the advantages of low cost and ease of application. However, the talk-down and talk-off performance in CAS tone signal detection of the CAS tone signal detection chip 11 is low because the CAS tone signal cannot eliminate the interference of a voice signal or external noises. Therefore, this CAS tone signal detection chip 11 cannot meet US Bellcore's SR-TSV-002476 and British BT specification requirements. Further, a DSP (digital signal process) may be used for detecting the presence of a CAS tone signal. The DSP achieves high talk-down and talk-off performance, however it is expensive, and its application is difficult to be achieved.

SUMMARY OF THE INVENTION

The present invention has been accomplished to provide a method which improves the drawbacks of the aforesaid conventional CAS tone detection methods. According to the present invention, when a small segment of a CAS tone signal is detected by a CAS tone signal detection chip, a mute circuit is operated to mute the voice signal from the near end subscriber, enabling the CAS tone signal detection chip to detect the time series of the left CAS tone signal, and a voice signal detection circuit to monitor the voice signal from the far end subscriber, so that the telephone can accurately measure the length of the received CAS tone signal and eliminate the interference of external noises and the voice signal from the near end or far end subscriber, and then determine, subject to the definition of the predetermined CAS tone signal length specification, whether the received CAS tone signal is true or false.

BRIEF DESCRIPTION OF THE DRAWINGS

FIG. 1 is a CAS tone signal parameter characteristics table according to British CIDCW specifications SIN242 and SIN 227.

DETAILED DESCRIPTION OF THE PREFERRED EMBODIMENT

When a CAS tone signal detection chip measures the received CAS tone signal, it takes a certain length of time to recognize the CAS tone signal after capture of the CAS tone signal. Within the length of time used in recognizing the CAS tone signal, the voice signal from the near end is muted, and the voice signal from the far end is monitored, so that the length of the CAS tone signal can be accurately measured and interference can be eliminated during the measurement, enabling the CAS tone signal to be correctly recognized.

Figure 2:
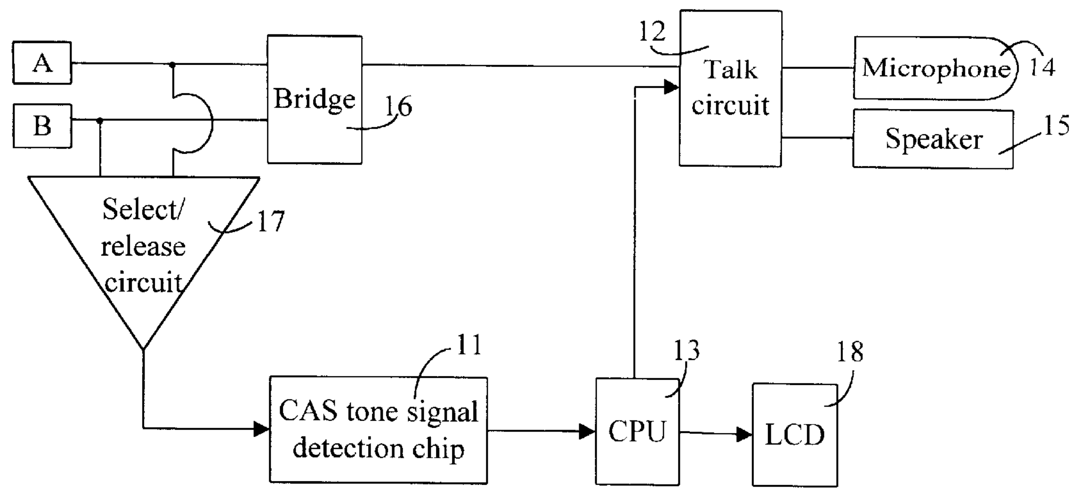
FIG. 2 illustrates the hardware architecture of a telephone with CIDCW identification function according to the prior art.
Figure 3:
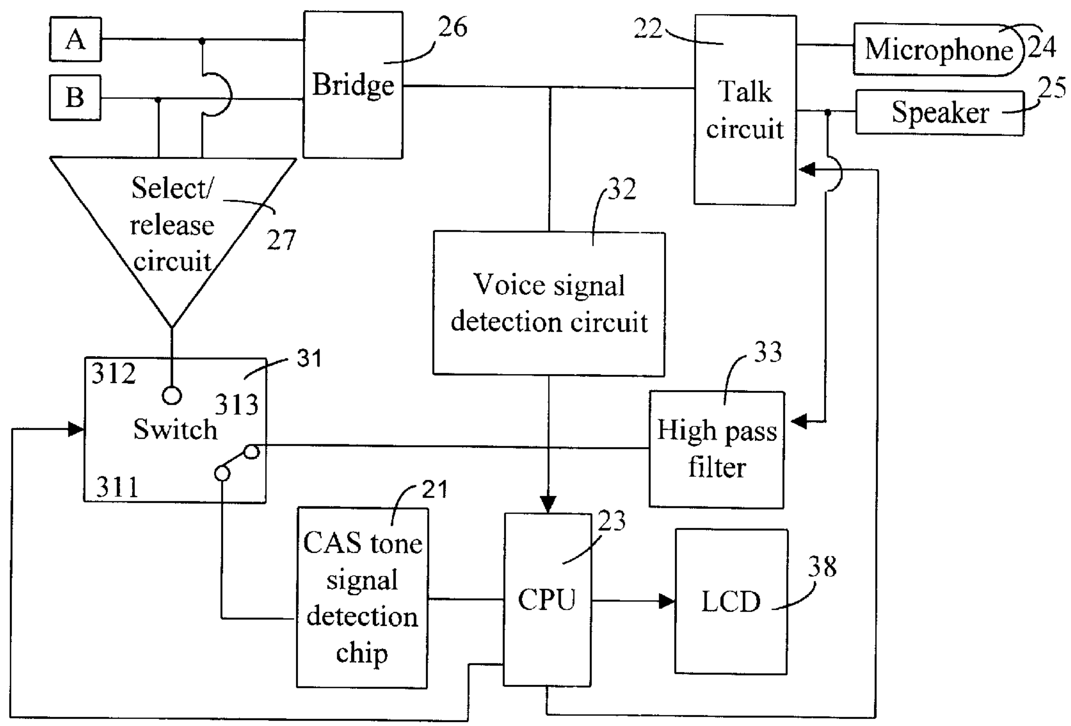
FIG. 3 illustrates the hardware architecture of a telephone with CIDCW identification function according to the present invention.

Referring to FIG. 3, a telephone according to the present invention essentially comprises a CAS tone signal detection chip 21 (which can be a Mitel 8843 chip), a talk circuit 22, a CPU (central processing unit) 23, a microphone 24, a speaker 25, a bridge 26, a select/release circuit 27, a LCD (liquid crystal display) 28, and a switch 31 connected between the select/release circuit 27 and the CAS tone signal detection chip 21 for switching between a data signal and a voice signal. The CPU 23 drives the switch 31 to connect contacts 311;312 when the telephone is on hook, enabling the CAS tone signal detection chip 21 to receive the data signal from terminals A;B through the select/release circuit 27. The CPU 23 drives the switch 31 to connect contacts 311;313 when the telephone is off hook, enabling the CAS tone signal detection chip 21 to receive the voice signal from talk circuit 22 and the speaker 25 through a high pass filter 33. The high pass filter 33 removes voice signals below a particular frequency (for example: 2000 Hz) so as to improve the signal-noise ratio of the CAS tone signal.

Figure 4:
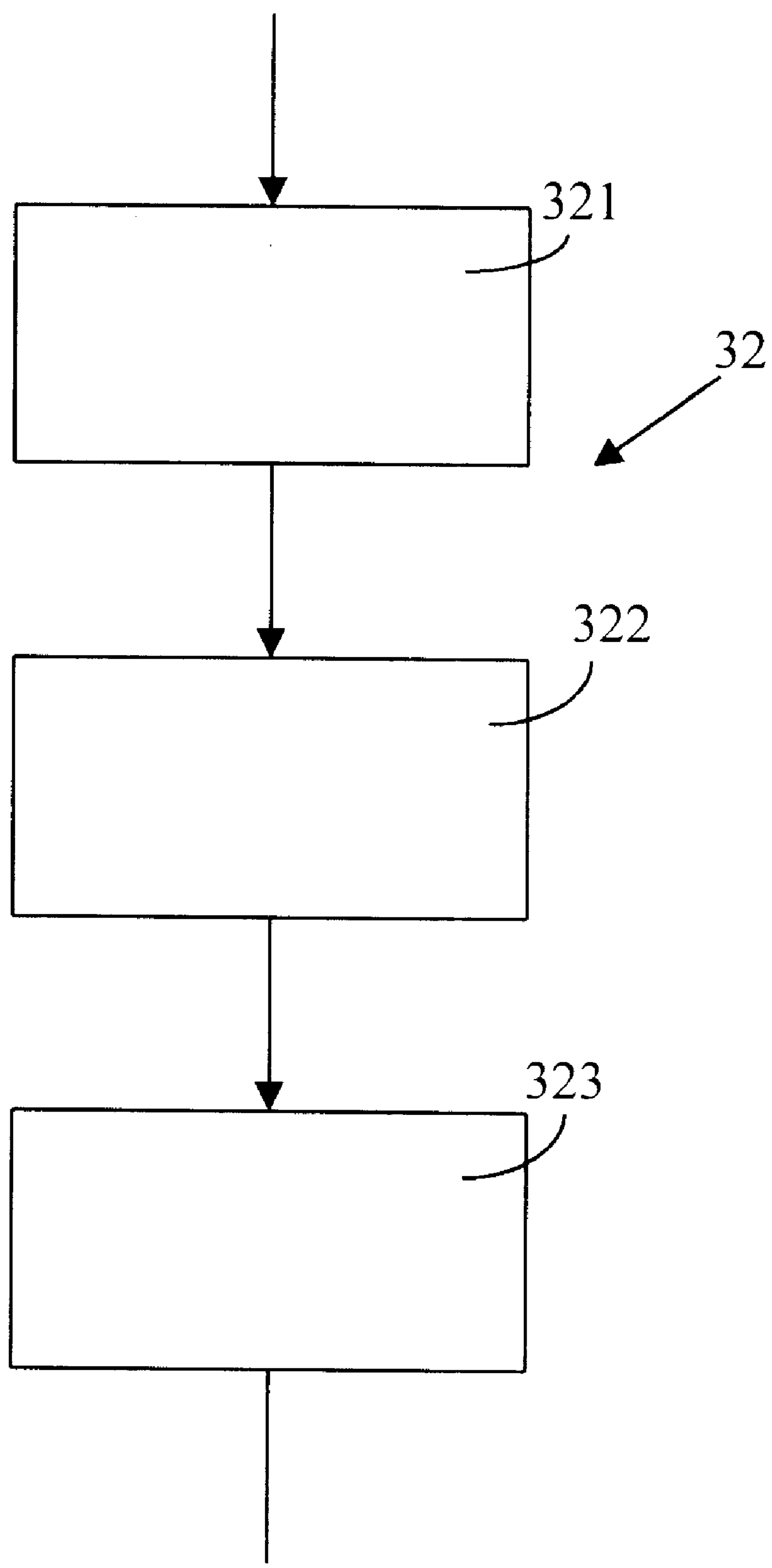
FIG. 4 illustrates the hardware architecture of the detection circuit according to the present invention.

A voice signal detection circuit 32 is provided to detect the presence of a voice signal between the bridge 26 and the talk circuit 22. If a voice signal is detected between the bridge 26 and the talk circuit 22, the voice signal detection circuit 32 outputs a high electrical level signal to the CPU 23, informing the CPU 23 of the presence of the voice signal between the bridge 26 and the talk circuit 22. The voice signal detection circuit 32, as shown in FIG. 4, is comprised of a band-pass filter 321, a rectifier 322 and an electrical level comparator 323. The band-pass filter 321 picks up a tone signal within a particular frequency range (for example: 300–3400 Hz) between the bridge 26 and the talk circuit 22. The rectifier 322 rectifies the tone signal picked up by the band-pass filter 321 into a DC electrical level. The electrical level comparator 323 compares the DC electrical level obtained from the rectifier 322 with a reference electrical level, and recognizes the tone signal when the DC electrical level surpasses the reference electrical level, or rejects the tone signal when the reference electrical level surpasses the DC electrical level.

Figure 5:
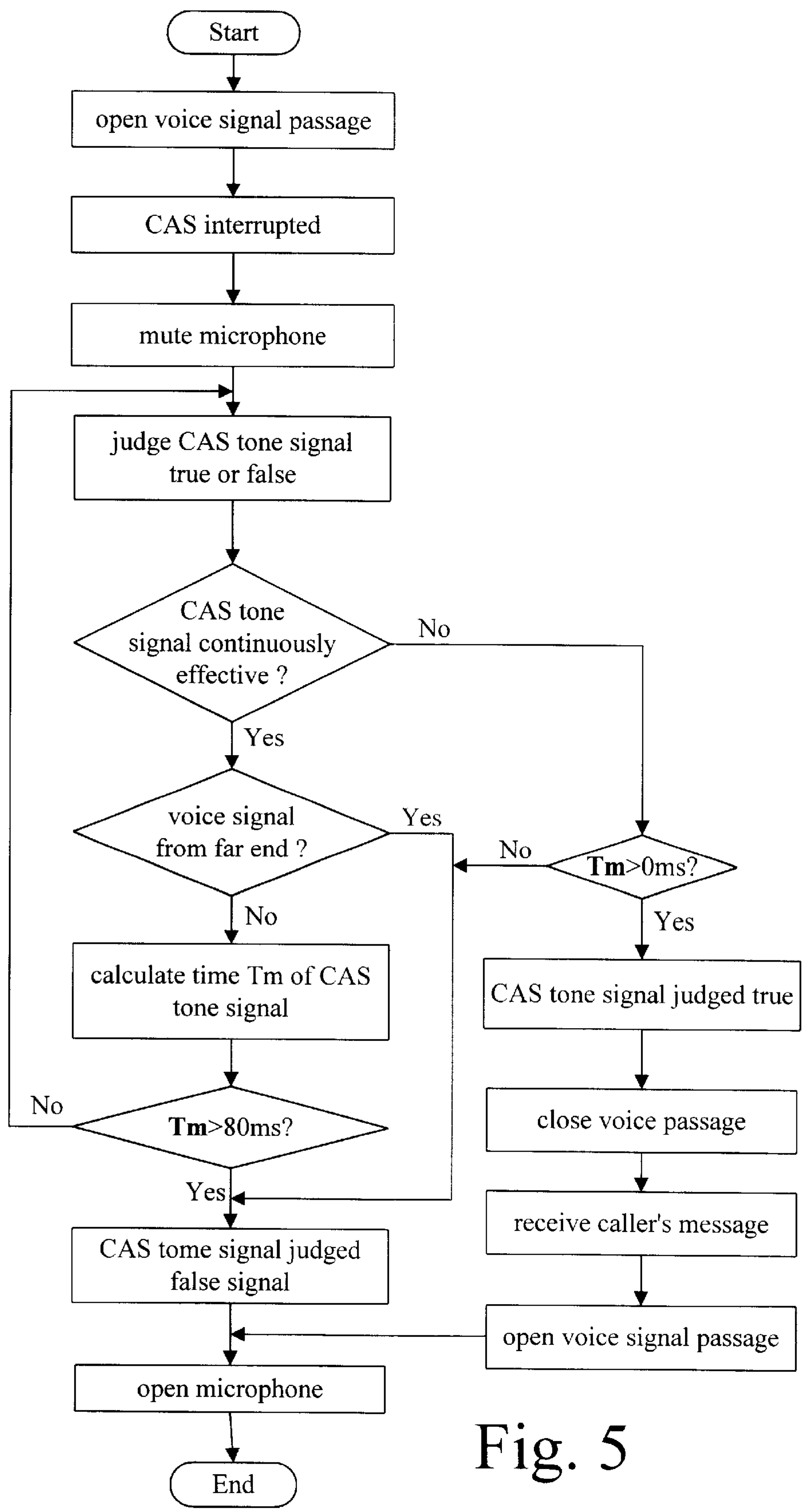
FIG. 5 is a system flow chart according to the present invention.

Referring to FIG. 5, when the telephone is on hook, the CPU 23 drives the switch 31 to connect the contacts 311;312, enabling the CAS tone signal detection chip 21 to receive the data signal from terminals A;B through the select/release circuit 27. When the telephone is off hook, the CPU 23 drives the switch 31 to connect the contacts 311;313, enabling the CAS tone signal detection chip 21 to receive the voice signal from talk circuit 22 and the speaker 25 through the high pass filter 33, and at the same time the high pass filter 33 removes the tone signal below a particular frequency (for example: 2000 Hz), so that the CAS tone signal is identified.

Upon detection of the CAS tone signal, the CAS tone signal detection chip 21 triggers an interruption signal, causing the CPU 23 to produce a mute signal to mute the talk circuit 22, so that the voice signal from the caller through the microphone 24 is muted, and voice signal interference from the near end is eliminated. After mute, the CPU 23 judges the time series of the CAS tone signal, and then drives the voice signal detection circuit 32 to monitor the presence of a voice signal between the bridge 26 and the talk circuit 22 if the CAS tone signal is confirmed effective.

If a voice signal from the remote end is detected by the voice signal detection circuit 32, the received CAS tone signal is confirmed false, at this time, the voice signal detection circuit 32 outputs a high electrical level signal to the CPU 23, causing the CPU 23 to output a signal to the talk circuit 22, so as to open the microphone.

On the contrary, if the voice signal detection circuit 32 detects no signal, the CPU 23 judges the time series of the effective CAS tone signal detected by the CAS tone signal detection chip 21, and calculates the time Tm of the CAS tone signal.

Figure 6:
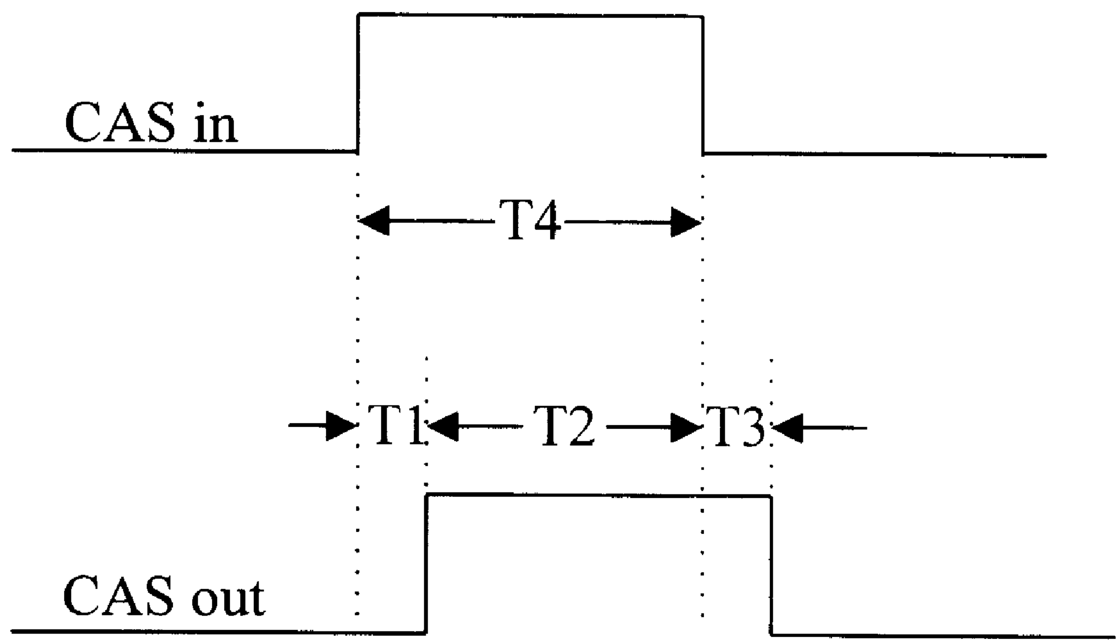
FIG. 6 is a CAS tone signal time series waveform chart according to the present invention.

FIG. 6 is a CAS tone signal time series waveform chart detected according to the present invention, in which the total length of the CAS tone signal time series before inputting into the CAS tone signal detection chip 21 is T4. According to Bellcore's specification definition, the value of T4 is within 75 ms to 85 ms. In the CAS tone signal time series outputted from the CAS tone signal detection chip 21, T1 is the front end recognition time before the CAS tone signal detection chip 21, i.e. the time of recognizing the start of the CAS tone signal, T3 is the rear end recognition time after the CAS tone signal detection chip 21, i.e. the time of recognizing the ending of the CAS tone signal, and T2 is the software recognition time. The time of T1 and the time of T3 are determined subject to the hardware circuit. According to the present preferred embodiment, the time of T1 is 10 ms, the time of T3 is 5 ms. From FIG. 6, it is known that T2=T4−T1=within the range between 65 ms to 75 ms.

According to the present invention, the time in which the CPU 23 calculates the length of the CAS tone signal detected by the CAS tone signal detection chip 21 is Tm=T2+T3. To the CPU 23, the CAS tone signal is still an effective output when within the range of T3, therefore the length of the CAS tone signal is within the time range between 70 ms to 80 ms, i.e., the CAS tone signal measured within such time range can be confirmed true.

Therefore, if the value of Tm calculated by the CPU 23 surpasses 80 ms, the received CAS tone signal is confirmed false, and at this time the CPU 23 gives a signal to the talk circuit 22, causing it to open the microphone 24.

On the contrary, if the value of Tm calculated by the CPU 23 is below 80 ms, the CPU 23 keeps calculating the CAS tone signal detected by the CAS tone signal detection chip 21 until a false CAS tone signal is confirmed. When a false CAS tone signal is confirmed, the CPU 23 calculates the value of Tm, and checks whether the value of Tm surpasses 70 ms or not, and the CAS tone signal is judged false if the value of Tm is below 70 ms, or true if surpasses 70 ms. If the CAS tone signal is judged true, the CPU 23 immediately drives the switch 31 to connect the contacts 311;312 so as to close the voice signal passage, enabling the CPU 23 to receive the CIDCW data signal which follows after the CAS tone signal, and to transmit the telephone number, name and other information of the caller to the LCD 38 for display, and then to give a signal to the switch 31 after receipt of the data message from the caller, causing the switch 31 to connect the contacts 311;313 so as to open the voice signal passage and the microphone 24.

As stated above, the CAS tone signal detection chip 21 simultaneously detects the CAS tone signal and the voice signal within T1 (10 ms), and the interference of a near end voice signal or far end voice signal is eliminated during the detecting time, therefore the performance of high talk-down and talk-off in CAS tone signal detection is greatly improved.

It is to be understood that the drawings are designed for purposes of illustration only, and are not intended as a definition of the limits and scope of the invention disclosed.

What the invention claimed is:

1. A method of improving the CAS (customer premises equipment alert signal) tone signal detection of a telephone comprising the steps of:

i) muting the voice signal from the near end subscriber when a small segment of a CAS tone signal is detected by a CAS tone signal detection chip in the telephone;

ii) detecting the time series of the left CAS tone signal and monitoring the voice signal of the far end subscriber;

iii) measuring the length of the CAS tone signal when no voice signal from the far end subscriber or the near end subscriber is detected; and iv) judging, subject to the definition of a predetermined CAS tone signal length specification, whether the received CAS tone signal is true or false.

2. The method of claim 1 further comprising the step of judging the received CAS tone signal false and opening the microphone of the telephone when a voice signal from the far end subscriber is detected after the step ii) and before the step iii).

3. The method of claim 1 further comprising the step of judging the time series of the received CAS tone signal and calculating the continuing time Tm of the CAS tone signal when no voice signal from the far end subscriber is detected after the step ii) and before the step iii).

4. The method of claim 3, wherein the total length of the time series of the CAS tone signal before inputting into the CAS tone signal detection chip is T4; the time of recognizing the start of the CAS tone signal from the time series of the CAS tone signal outputted from the CAS tone signal detection circuit is T1; the time of recognizing the end of the CAS tone signal is T3; the software recognition time is T2; the time T1 and the time T3 are determined subject to the hardware circuit of the telephone; the CAS tone signal is judged true when Tm is within the range of T2+T3.

5. The method of claim 4, wherein when Tm is within the range of T2+T3, the CAS tone signal is judged true, and the voice signal passage of the telephone is closed, enabling the following data signal to be received by the telephone and the telephone number, name and other information of the caller contained in the data signal to be displayed, and the voice signal passage and the microphone of the telephone is opened again after completion of the receipt of the data signal.

6. The method of claim 4, wherein the CAS tone signal is judged false and the microphone is opened when Tm is out of the range of T2+T3.

7. A apparatus for improving the CAS (customer premises equipment alert signal) tone signal detection of a telephone, comprising:

a CPU (central processing unit) for controlling the operation of the parts of the telephone;

a CAS tone signal detection chip for detecting the CAS tone signal transmitted from the exchange line to the telephone; and a voice signal detection circuit for detecting the presence of a voice signal transmitted from the exchange line to the telephone;

wherein said CPU mutes the voice signal from the near end subscriber when said CAS tone signal detection chip detects a small segment of the CAS tone signal, then drives said CAS tone signal detection chip to detect the time series of the left CAS tone signal and said voice signal detection circuit to detect the presence of a voice signal from the far end subscriber, so that the telephone can accurately measure the length of the received CAS tone signal and eliminate the interference of external noises and the voice signal from the near end or far end subscriber, and then determine, subject to the definition of the predetermined CAS tone signal length specification, whether the received CAS tone signal is true or false.

8. The apparatus of claim 7, wherein said voice signal detection circuit comprises:

a band-pass filter controlled to pick up a tone signal within a predetermined frequency range from the voice signal from the far end subscriber;

a rectifier controlled to rectify the tone signal picked up by said band-pass filter into a DC electrical level; and an electrical level comparator controlled to compare the DC electrical level obtained from said rectifier with a reference electrical level, so as to recognize the tone signal when the DC electrical level surpasses the reference electrical level, or to reject the tone signal when the reference electrical level surpasses the DC electrical level.

9. The apparatus of claim 8 further comprising a switch controlled to switch between a data signal and a voice signal transmitted to said CAS tone signal detection chip, said switch being controlled by said CPU to form a data signal passage for enabling said CAS tone signal detection chip to receive a data signal from the exchange line when the telephone is on hook, said switch being controlled to said CPU to form a voice signal passage for enabling said CAS tone signal detection chip to receive a voice signal from the exchange line when the telephone is off hook.

10. The apparatus of claim 9 further comprising a high pass filter for receiving the voice signal transmitted from the exchange line to the CAS tone signal detection circuit and removing the frequencies below a predetermined range.

11. The apparatus of claim 8, wherein said CPU judges the time series of the effective CAS tone signal detected by said CAS tone signal detection chip and calculates the continuing time Tm of the CAS tone signal when no voice signal from the far end subscriber is detected.

12. The apparatus of claim 11 wherein the total length of the time series of the CAS tone signal before inputting into the CAS tone signal detection chip is T4; the time of recognizing the start of the CAS tone signal from the time series of the CAS tone signal outputted from the CAS tone signal detection circuit is T1; the time of recognizing the end of the CAS tone signal is T3; the software recognition time is T2; the time T1 and the time T3 are determined subject to the hardware circuit of the telephone; the time T2=T4−T1; the CAS tone signal is judged true when Tm is within the range off T2+T3.

13. The apparatus of claim 12, wherein when Tm is within the range of T2+T3, the CAS tone signal is judged true by said CPU, and said CPU drives said switch to close the voice signal passage, so as to receive the data signal following after the CAS tone signal, and to transmit the telephone number, name and other information of the caller contained in the data signal to a liquid crystal display for display, and then to open the voice signal passage and the microphone of the telephone after completion of the receipt of the data signal.

14. The apparatus of claim 12, wherein the CAS tone signal is judged false and the microphone is opened by said CPU when Tm is out of the range of T2+T3.

* * * * *